(12) United States Patent
Yamamoto et al.

(10) Patent No.: US 6,168,076 B1
(45) Date of Patent: Jan. 2, 2001

(54) ELECTRONIC CASH REGISTER AND PRICE CALCULATION METHOD

(75) Inventors: Mayumi Yamamoto, Yokosuka; Toshiaki Aoki, Yokoyama, both of (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 09/149,176

(22) Filed: Sep. 8, 1998

(30) Foreign Application Priority Data

Apr. 9, 1998 (JP) .................................................. 10-097528

(51) Int. Cl.[7] ...................................................... G07G 1/00
(52) U.S. Cl. ................................ 235/7 R; 235/12; 705/16
(58) Field of Search ................................. 235/7 R, 8, 12, 235/15, 375, 378; 705/16, 20

(56) References Cited

U.S. PATENT DOCUMENTS

| | | | |
|---|---|---|---|
| 4,547,851 | 10/1985 | Kurland | 364/401 |
| 4,553,222 | 11/1985 | Kurland et al. | 364/400 |
| 4,723,212 | 2/1988 | Mindrum et al. | 364/601 |
| 4,734,857 | 3/1988 | Fujiwara et al. | 364/401 |
| 4,821,186 | 4/1989 | Munakata et al. | 364/405 |
| 4,843,547 | * 6/1989 | Fuyama et al. | 364/405 |
| 4,903,200 | * 2/1990 | Mook, Jr. | 364/405 |
| 5,053,957 | 10/1991 | Suzuki | 364/405 |
| 5,128,862 | 7/1992 | Mueller | 364/405 |
| 5,297,030 | * 3/1994 | Vassigh et al. | 364/405 |
| 5,377,097 | 12/1994 | Fuyama et al. | 364/405 |
| 5,406,035 | 4/1995 | Wallisch | 364/401 |
| 5,481,094 | 1/1996 | Suda | 235/483 |
| 5,504,675 | 4/1996 | Cragun et al. | 364/401 |
| 5,589,676 | * 12/1996 | Iguchi | 235/7 R |
| 5,602,730 | 2/1997 | Coleman et al. | 395/215 |

* cited by examiner

*Primary Examiner*—Karl D. Frech
*Assistant Examiner*—Daniel St. Cyr
(74) *Attorney, Agent, or Firm*—Louis Woo

(57) ABSTRACT

Unit items ordered by a customer are accepted. An automatic selection is given of unit items, from among the accepted unit items, which compose at least one of predetermined set-menu item combinations having respective predetermined discount prices. A price corresponding to a customer's order is calculated in response to the predetermined discount price of the previously-mentioned one of the predetermined set-menu item combinations.

8 Claims, 15 Drawing Sheets

FIG. 7

| ORDER CONTENTS | NUMBER |
|---|---|
| HAMB | 1 |
| CHB | 1 |
| MEDFRY | 1 |
| M COKE | 1 |

FIG. 8

| VM# | 1 | 2 |
|---|---|---|
| VM name | HAMB SET | CHB SET |
| FIXED ITEM#1 | HAMB | CHB |
| NUMBER | 1 | 1 |
| FIXED ITEM#2 | MEDFRY | MEDFRY |
| NUMBER | 1 | 1 |
| AI# | 1 | 1 |

FIG. 9

| AI# | 1 |
|---|---|
| ITEM#1 | M COKE |
| ITEM#2 | M SPRT |
| : | |

FIG. 10

| VMP# | 1 | 2 | 3 | 4 |
|---|---|---|---|---|
| VM# | 2 | 1 | 2 | 1 |
| AI | M COKE | M COKE | M SPRT | M SPRT |

| ORDER CONTENTS | NUMBER |
|---|---|
| HAMB | 1 |
| CHB | 1 |
| MEDFRY | 1 |
| M COKE | 1 |

| VM#1 | | NUMBER |
|---|---|---|
| FIXED ITEM#1 | HAMB | 1 |
| FIXED ITEM#2 | MEDFRY | 1 |

REGISTERED CONTENTS: 1

| VM# | 1 | | | 2 | | |
|---|---|---|---|---|---|---|
| | | NUMBER | MAX NUMBER | | NUMBER | MAX NUMBER |
| FIXED ITEM#1 | HAMB | 1 | 1 | CHB | 1 | 1 |
| FIXED ITEM#2 | MEDFRY | 1 | | MEDFRY | 1 | |

| VMP# | 1 | | | 2 | | |
|---|---|---|---|---|---|---|
| | | NUMBER | MAX NUMBER | | NUMBER | MAX NUMBER |
| MAX NUMBER | VM#2 | 1 | 1 | VM#1 | 1 | 1 |
| Any Itemn | M COKE | 1 | | M COKE | 1 | |

FIG. 16

| VMP# WITH HAMB | NUMBER | SUM "a" |
|---|---|---|
| 1 | 1 | 2 |
| 2 | 1 | |

| ORDERED COLA NUMBER |
|---|
| 1 |

REGISTERED CONTENTS

| INFLUENCE PRESENT | (1) |
|---|---|

FIG. 17

| ITEM | VMP# WITH ITEM | NUMBER | SUM | ORDERED ITEM NUMBER | DEGREE OF INFLUENCE |
|---|---|---|---|---|---|
| HAMB | 1 | 1 | 1 | 1 | 0 |
| CHB | 2 | 1 | 1 | 1 | 0 |
| MEDFRY | 1 | 1 | 2 | 1 | 1 |
| | 2 | 1 | | | |
| M COKE | 1 | 1 | 2 | 1 | 1 |
| | 2 | 1 | | | |

FIG. 18

| VMP# | 1 | | | 2 | | |
|---|---|---|---|---|---|---|
| | ITEM INFLUENCE NUMBER | | VMP INFLUENCE NUMBER | ITEM INFLUENCE NUMBER | | VMP INFLUENCE NUMBER |
| FIXED ITEM#1 | CHB | 0 | 2 | HAMB | 0 | 2 |
| FIXED ITEM#2 | MEDFRY | 1 | | MEDFRY | 1 | |
| Any Item | M COKE | 1 | | M COKE | 1 | |

FIG. 19

| VMP# | 1 | 2 | 3 | 4 |
|---|---|---|---|---|
| VM# | 2 | 1 | 2 | 1 |
| AI | M COKE | M COKE | M SPRT | M SPRT |
| SETTLED NUMBER | 1 | | | |

FIG. 20

| ORDER CONTENTS | NUMBER |
|---|---|
| HAMB | 1 |
| CHB | 0 |
| MEDFRY | 0 |
| M COKE | 0 |

FIG. 21

| VM# | 1 | | |
|---|---|---|---|
| | | NUMBER | MAX NUMBER |
| FIXED ITEM#1 | HAMB | 1 | |
| FIXED ITEM#2 | MEDFRY | | |

FIG. 22

```
1 CHB SET    9.99
  1 CHB
  1 MEDFRY
  1 M COKE
1 HAMB        9.99
```

FIG. 23

| | FIRST EXECUTION | | SECOND EXECUTION | | THIRD EXECUTION | |
|---|---|---|---|---|---|---|
| | ORDER CONTENTS | ITEM INFLUENCE NUMBER | ORDER CONTENTS | ITEM INFLUENCE NUMBER | ORDER CONTENTS | ITEM INFLUENCE NUMBER |
| HAMB | 1 | — | 1 | 0 | 1 | — |
| CHB | 1 | — | 1 | 0 | 0 | — |
| MEDFRY | 1 | — | 1 | 1 | 0 | — |
| M COKE | 1 | — | 1 | 1 | 0 | — |
| | VMP MAX NUMBER | VMP INFLUENCE NUMBER | VMP MAX NUMBER | VMP INFLUENCE NUMBER | VMP MAX NUMBER | VMP INFLUENCE NUMBER |
| VMP#1 | 0 | — | ① | 1 | 0 | — |
| VMP#2 | 0 | — | 1 | 1 | 0 | — |

FIG. 24

| ORDER CONTENTS | NUMBER |
|---|---|
| HAMB | 1 |
| CHB | 1 |
| MEDFRY | 2 |
| M COKE | 1 |
| M SPRT | 1 |

FIG. 25

| VM# | 1 | 2 |
|---|---|---|
| VM name | HAMB SET | CHB SET |
| FIXED ITEM#1 | HAMB | CHB |
| NUMBER | 1 | 1 |
| FIXED ITEM#2 | MEDFRY | MEDFRY |
| NUMBER | 1 | 1 |
| AI# | 1 | 2 |

FIG. 26

| AI# | 1 | 2 |
|---|---|---|
| ITEM#1 | M COKE | M COKE |
| ITEM#2 | M SPRT | |
| : | | |

FIG. 27

| VMP# | 1 | 2 | 3 |
|---|---|---|---|
| VM# | 1 | 2 | 1 |
| AI | M COKE | M COKE | M SPRT |

FIG. 28

| VM# | | 1 | | | 2 | |
|---|---|---|---|---|---|---|
| | | NUMBER | MAX NUMBER | | NUMBER | MAX NUMBER |
| FIXED ITEM#1 | HAMB | 1 | 1 | CHB | 1 | 1 |
| FIXED ITEM#2 | MEDFRY | 2 | | MEDFRY | 2 | |

FIG. 29

| VMP# | 1 | | 2 | | 3 | |
|---|---|---|---|---|---|---|
| | NUMBER | MAX NUMBER | NUMBER | MAX NUMBER | NUMBER | MAX NUMBER |
| MAX NUMBER | VM#1 | 1 | 1 | VM#2 | 1 | 1 | VM#1 | 1 | 1 |
| Any Item | M COKE | 1 | | M COKE | 1 | | M SPRT | 1 | |

FIG. 30

| ITEM | VMP# WITH ITEM | NUMBER | SUM | ORDERED ITEM NUMBER | DEGREE OF INFLUENCE |
|---|---|---|---|---|---|
| HAMB | 1 | 1 | 2 | 1 | 1 |
| | 2 | 1 | | | |
| CHB | 3 | 1 | 1 | 1 | 0 |
| MEDFRY | 1 | 1 | 3 | 1 | 1 |
| | 2 | 1 | | | |
| | 3 | 1 | | | |
| M COKE | 1 | 1 | 2 | 1 | 1 |
| | 2 | 1 | | | |
| M SPRT | 3 | 1 | 1 | 1 | 0 |

FIG. 31

| VMP# | 1 | | | 2 | | | 3 | | |
|---|---|---|---|---|---|---|---|---|---|
| | ITEM INFLUENCE NUMBER | | VMP INFLUENCE NUMBER | ITEM INFLUENCE NUMBER | | VMP INFLUENCE NUMBER | ITEM INFLUENCE NUMBER | | VMP INFLUENCE NUMBER |
| FIXED ITEM#1 | HAMB | 1 | 3 | CHB | 0 | 2 | HAMB | 1 | 2 |
| FIXED ITEM#2 | MEDFRY | 1 | | MEDFRY | 1 | | MEDFRY | 1 | |
| Any Item | M COKE | 1 | | M COKE | 1 | | M SPRT | 0 | |

FIG. 32

| VMP# | 1 | 2 | 3 |
|---|---|---|---|
| VM# | 1 | 2 | 1 |
| AI | M COKE | M COKE | M SPRT |
| SETTLED NUMBER | | 1 | |

FIG. 33

| ORDER CONTENTS | NUMBER |
|---|---|
| HAMB | 1 |
| CHB | 0 |
| MEDFRY | 1 |
| M COKE | 0 |
| M SPRT | 1 |

FIG. 34

| VM# | 1 | |
|---|---|---|
| | NUMBER | MAX NUMBER |
| FIXED ITEM#1 | HAMB | 1 | 1 |
| FIXED ITEM#2 | MEDFRY | 1 | |

FIG. 35

| VMP# | 3 | |
|---|---|---|
| | NUMBER | MAX NUMBER |
| MAX NUMBER | VM#1 | 1 | 1 |
| Any Item | M SPRT | 1 | |

FIG. 36

| VMP# | 1 | 2 | 3 |
|---|---|---|---|
| VM# | 1 | 2 | 1 |
| AI | M COKE | M COKE | M SPRT |
| SETTLED NUMBER | | 1 | 1 |

FIG. 37

| ORDER CONTENTS | NUMBER |
|---|---|
| HAMB | 0 |
| CHB | 0 |
| MEDFRY | 0 |
| M COKE | 0 |
| M SPRT | 0 |

FIG. 38

```
1 CHB_SET    9.99
  1 CHB
  1 MEDFRY
  1 M_COKE
1 HAMB       9.99
  1 HAMB
  1 MEDFRY
  1 M SPRT
```

FIG. 39

| | FIRST EXECUTION | | SECOND EXECUTION | | THIRD EXECUTION | |
|---|---|---|---|---|---|---|
| | ORDER CONTENTS | ITEM INFLUENCE NUMBER | ORDER CONTENTS | ITEM INFLUENCE NUMBER | ORDER CONTENTS | ITEM INFLUENCE NUMBER |
| HAMB | 1 | — | 1 | 1 | 1 | — |
| CHB | 1 | — | 1 | 0 | 0 | — |
| MEDFRY | 2 | — | 2 | 1 | 1 | — |
| M COKE | 1 | — | 1 | 1 | 0 | — |
| M SPRT | 1 | — | 1 | 0 | 1 | — |
| | VMP MAX NUMBER | VMP INFLUENCE NUMBER | VMP MAX NUMBER | VMP INFLUENCE NUMBER | VMP MAX NUMBER | VMP INFLUENCE NUMBER |
| VMP#1 | 0 | — | 1 | 3 | 0 | — |
| VMP#2 | 0 | — | ① | 2 | 0 | — |
| VMP#3 | 0 | — | 1 | 2 | ① | — | under
ELECTRONIC CASH REGISTER AND PRICE CALCULATION METHOD

BACKGROUND OF THE INVENTION

1. Field of the Invention

This invention relates to an electronic cash register, and a price calculation method used therein.

2. Description of the Related Art

Some fast-food stores have both a normal menu for unit items and a set menu for predetermined combinations of specified unit items. A discount is given on each set-menu item combination. Accordingly, the price of each set-menu item combination is lower than the sum of the prices of the unit items therein. The price of the set-menu item combination is called the set price or the discount price.

A typical electronic cash register in a fast-food store has first keys for unit items and second keys for set-menu item combinations. When the second keys are operated in response to customer's orders, the electronic cash register applies the discount prices of corresponding set-menu item combinations to the customer's orders. On the other hand, a discount price is not applied in the following case. A customer orders unit items, and corresponding ones of the first keys of the electronic cash register are operated. The ordered unit items are accidentally equal to the unit items of a set-menu item combination, and the customer does not point out that the customer's order is based on a set menu.

Accordingly, the typical electronic cash register fails to apply a discount price when a customer accidentally orders unit items equal to the items of a set-menu item combination.

SUMMARY OF THE INVENTION

It is a first object of this invention to provide an improved electronic cash register.

It is a second object of this invention to provide an improved price calculation method.

A first aspect of this invention provides a method of calculating a price corresponding to a customer's order which comprises the steps of accepting unit items ordered by a customer; automatically selecting unit items, from among the accepted unit items, which compose at least one of predetermined set-menu item combinations having respective predetermined discount prices; and calculating a price corresponding to a customer's order in response to the predetermined discount price of said one of the predetermined set-menu item combinations.

A second aspect of this invention is based on the first aspect thereof, and provides a method wherein the automatically selecting step comprises selecting possible set-menu item combinations from among the predetermined set menu item combinations in response to the accepted unit items; selecting a final set-menu item combination from among the possible set-menu item combinations in response to parameters of the respective possible set-menu item combinations; and automatically selecting unit items, from among the accepted unit items, which compose the final set-menu item combination.

A third aspect of this invention is based on the second aspect thereof, and provides a method wherein the parameters include the predetermined discount prices of the respective possible set-menu item combinations.

A fourth aspect of this invention provides an electronic cash register comprising a memory for storing first information of predetermined set-menu item combinations and second information of predetermined discount prices of the respective predetermined set-menu item combinations; an input section for accepting items ordered by a customer; a menu search unit for deciding whether or not items among the accepted items compose at least one of the predetermined set-menu item combinations by referring to the first information stored in the memory; and a calculator for, when the menu search unit decides that items among the accepted items compose at least one of the predetermined set-menu item combinations, calculating a price corresponding to a customer's order in response to the predetermined discount price of said one of the predetermined set-menu item combinations by referring to the second information stored in the memory.

A fifth aspect of this invention is based on the fourth aspect thereof, and provides an electronic cash register wherein the menu search unit comprises means for searching the first information in the memory for a set-menu item combination, among the predetermined set-menu item combinations, which is composed of items among the accepted items.

A sixth aspect of this invention is based on the fourth aspect thereof, and provides an electronic cash register wherein the menu search unit comprises means for selecting possible set-menu item combinations from among the predetermined set menu item combinations in response to the accepted items; means for selecting a final set-menu item combination from among the possible set-menu item combinations in response to parameters of the respective possible set-menu item combinations; and means for storing information of the parameters of the respective possible set-menu item combinations.

A seventh aspect of this invention provides a method of calculating a price corresponding to a customer's order which comprises the steps of accepting unit items ordered by a customer; deciding whether or not unit items among the accepted unit items compose a predetermined set-menu item combination having a predetermined discount price; and when it is decided that unit items among the accepted unit items compose the predetermined set-menu item combination, calculating a price corresponding to a customer's order in response to the predetermined discount price.

An eighth aspect of this invention provides an electronic cash register comprising first means for accepting unit items ordered by a customer; second means for deciding whether or not unit items among the accepted unit items compose a predetermined set-menu item combination having a predetermined discount price; and third means for, when the second means decides that unit items among the accepted unit items compose the predetermined set-menu item combination, calculating a price corresponding to a customer's order in response to the predetermined discount price.

BRIEF DESCRIPTION OF THE DRAWINGS

FIG. 7 is a diagram of an order-content table made in the electronic cash register of FIG. 4.

FIG. 8 is a diagram of a table of possible value meals which is made in the electronic cash register of FIG. 4.

FIG. 9 is a diagram of a table of "any" items which is made in the electronic cash register of FIG. 4.

FIG. 10 is a diagram of a table of value meal prices which is made in the electronic cash register of FIG. 4.

FIG. 16 is a diagram of a value meal price table, a cola number table, and registered contents which are provided in the electronic cash register of FIG. 4.

FIG. 17 is a diagram of a table of item-dependent influence numbers which is made in the electronic cash register of FIG. 4.

FIG. 18 is a diagram of a table of VMP-dependent influence numbers which is made in the electronic cash register of FIG. 4.

FIG. 19 is a diagram of a table of set registration contents which is made in the electronic cash register of FIG. 4.

FIG. 20 is a diagram of an order-content table made in the electronic cash register of FIG. 4.

FIG. 21 is a diagram of a table of VM-dependent maximum acquisition numbers which is made in the electronic cash register of FIG. 4.

FIG. 22 is a plan view of a receipt printed out by the electronic cash register of FIG. 4.

FIG. 23 is a diagram of operation of the electronic cash register of FIG. 4.

FIG. 24 is a diagram of an order-content table made in the electronic cash register of FIG. 4.

FIG. 25 is a diagram of a table of possible value meals which is made in the electronic cash register of FIG. 4.

FIG. 26 is a diagram of a table of "any" items which is made in the electronic cash register of FIG. 4.

FIG. 27 is a diagram of a table of value meal prices which is made in the electronic cash register of FIG. 4.

FIG. 28 is a diagram of a table of VM-dependent maximum acquisition numbers which is made in the electronic cash register of FIG. 4.

FIG. 29 is a diagram of a table of VMP-dependent maximum acquisition numbers which is made in the electronic cash register of FIG. 4.

FIG. 30 is a diagram of a table of item-dependent influence numbers which is made in the electronic cash register of FIG. 4.

FIG. 31 is a diagram of a table of VMP-dependent influence numbers which is made in the electronic cash register of FIG. 4.

FIG. 32 is a diagram of a table of set registration contents which is made in the electronic cash register of FIG. 4.

FIG. 33 is a diagram of an order-content table made in the electronic cash register of FIG. 4.

FIG. 34 is a diagram of a table of VM-dependent maximum acquisition numbers which is made in the electronic cash register of FIG. 4.

FIG. 35 is a diagram of a table of VMP-dependent maximum acquisition numbers which is made in the electronic cash register of FIG. 4.

FIG. 36 is a diagram of a table of set registration contents which is made in the electronic cash register of FIG. 4.

FIG. 37 is a diagram of an order-content table made in the electronic cash register of FIG. 4.

FIG. 38 is a plan view of a receipt printed out by the electronic cash register of FIG. 4.

FIG. 39 is a diagram of operation of the electronic cash register of FIG. 4.

DESCRIPTION OF THE PREFERRED EMBODIMENTS

A prior-art electronic cash register will be explained below for a better understanding of this invention.

Figure 1:
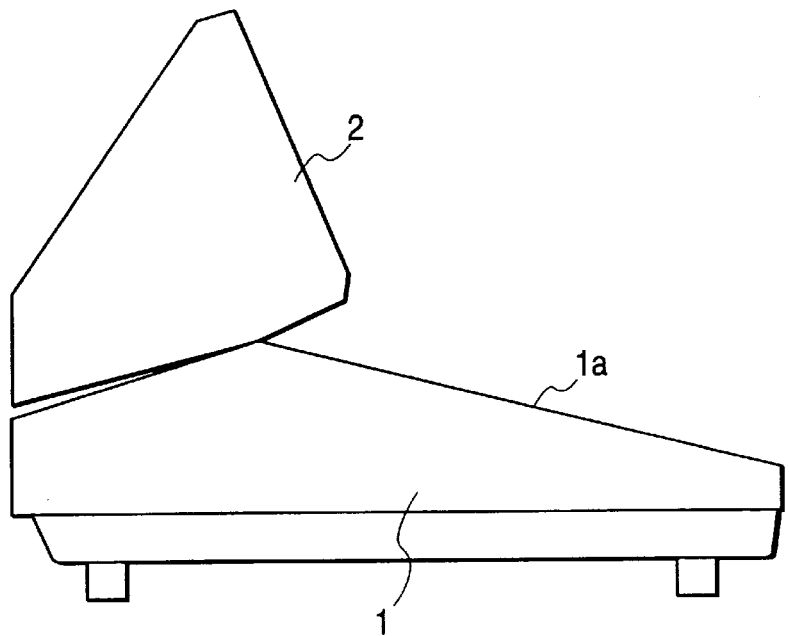
FIG. 1 is a side view of a prior-art electronic cash register.

FIG. 1 shows a prior-art electronic cash register used in a point-of-sale (POS) system. The prior-art cash register of FIG. 1 has a body 1 and a display 2. An upper surface 1a of the register body 1 is provided with a keyboard.

Figure 2:
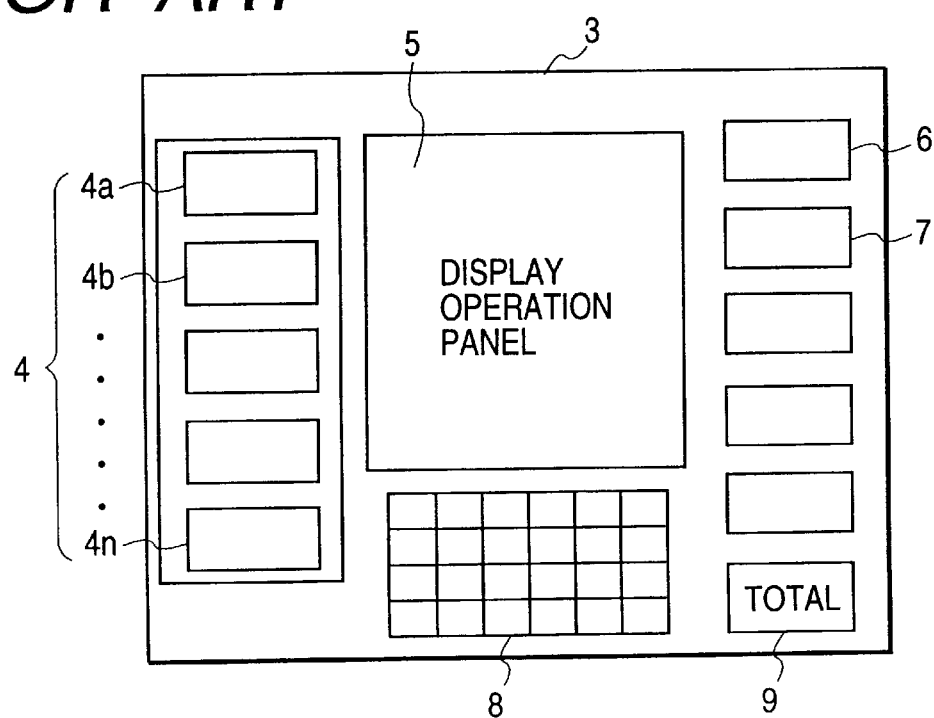
FIG. 2 is a plan view of a keyboard in the prior-art electronic cash register of FIG. 1.

As shown in FIG. 2, the keyboard 3 in the prior-art cash register of FIG. 1 has an array of set-menu keys 4 including an "A" set key 4a, a "B" set key 4b, . . . , and an "N" set key 4n for designating respective predetermined set-menu combinations of specified unit items. The keyboard 3 has a display/operation panel 5 for indicating the names of items, and for designating an item or items among them.

The keyboard 3 has a drink key 6 for designating drink items. When the drink key 6 is depressed, the names of available drink items are indicated on the display/operation panel 5 and an operator is allowed to designate a drink item or drink items among them via the display/operation panel 5 in accordance with a customer's order.

The keyboard 3 has a set-menu drink key 7 for designating a drink item associated with an ordered set-menu item combination. Specifically, in the case where a set-menu item combination is ordered by a customer and a drink item associated therewith is subsequently ordered, the set-menu drink key 7 is depressed by the operator. The names of drink items which can be associated with the ordered set-menu item combination are indicated on the display/operation panel 5. The operator is allowed to designate a drink item among the indicated drink items via the display/operation panel 5 in accordance with the customer's order.

The keyboard 3 has an array of keys 8 for designating unit items (unit food items) respectively. One or more of the keys 8 are depressed to designate a corresponding unit item or corresponding unit items in accordance with a customer's order. Furthermore, the keyboard 3 has a totalizing key 9 for starting a process of calculating a total sum of the prices of ordered items.

Figure 3:
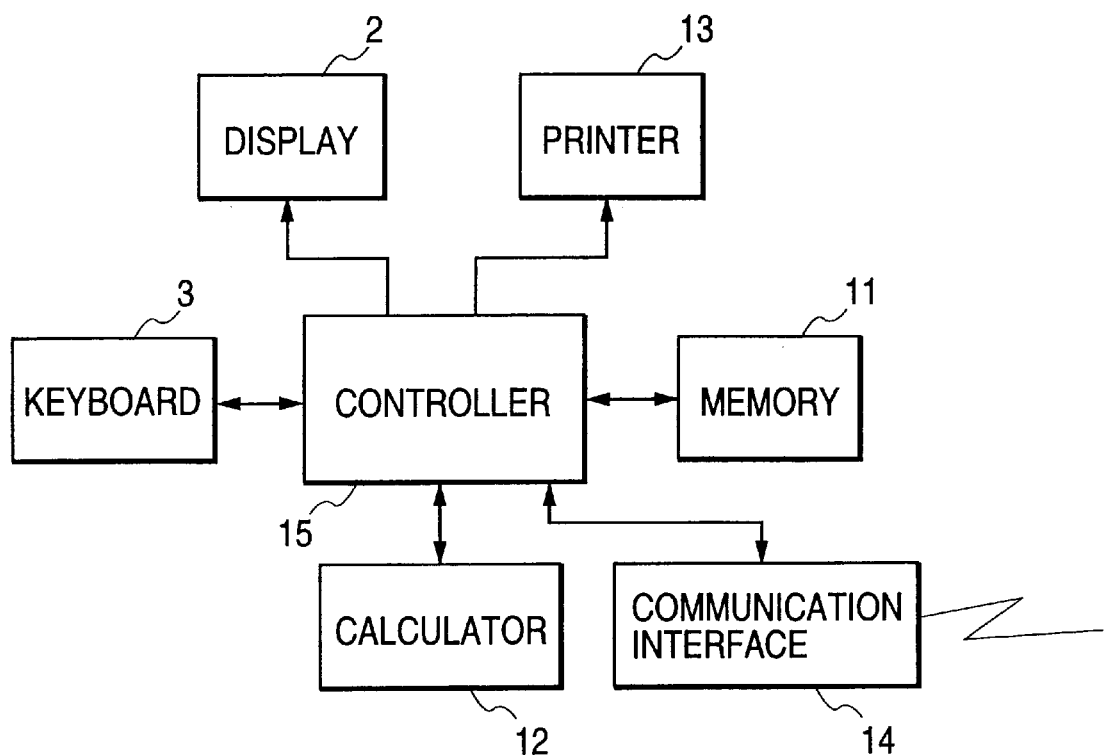
FIG. 3 is a block diagram of the prior-art electronic cash register in FIG. 1.

With reference to FIG. 3, the body 1 of the prior-art cash register of FIG. 1 includes a memory 11, a calculator 12, a printer 13, a communication interface 14, and a controller 15. As shown in FIG. 3, the controller 15 is connected to the display 2, the keyboard 3, the memory 11, the calculator 12, the printer 13, and the communication interface 14. The controller 15 has a microcomputer or a similar device programmed to implement various processes.

The memory 11 stores menu-related information representing the types (the names) of unit items, the prices of the unit items, the types (the names) of set-menu item combinations, the discount prices of the set-menu item combinations, the names of drink items which can be associated with the set-menu item combinations, and the discount prices of the drink items which are applied when the drink items are ordered together with the set-menu item combinations. The controller 15 can read out the menu-related information from the memory 11. The calculator 12 serves to compute prices correspond to customer's orders respectively. The printer 13 serves to generate and output receipts or other printed matters. The communication interface 14 is connected to a master apparatus in a center via a communication network. The communication interface 14 is used for data communication between the cash register and the master apparatus. The memory 11, the calculator 12, the printer 13, and the communication interface 14 are controlled by the controller 15. In addition, the display 2 and the keyboard 3 are controlled by the controller 15.

The prior-art cash register of FIGS. 1–3 operates as follows. When a customer orders a unit item, an operator depresses one of the keys 8, which corresponds to the ordered unit item, to accept the customer's order. An example of the unit item is a hamburger, a cheeseburger, a fishburger, a pack of fried potato, or a piece of apple pie. When the customer further orders a drink item, the operator depresses the drink key 6. The names of available drink items are indicated on the display/operation panel 5 in response to the depression of the drink key 6. The operator designates the ordered drink item from among the indicated drink items by actuating the display/operation panel 5. When the customer's order has been completed, the operator depresses the totalizing key 9. The controller 15 starts the calculator 12 in response to the depression of the totalizing key 9. The calculator 12 searches the menu-related information in the memory 11 for the ordered items and their prices via the controller 15. The calculator 12 computes the total sum of the prices. Information of the computation result, that is, information of the calculated total price, is transmitted from the calculator 12 to the display 2. The calculated total price is indicated on the display 2.

When a customer orders a set-menu item combination, the operator depresses one of the set-menu keys 4, which corresponds to the ordered set-menu item combination, to accept the customer's order. In the case where the ordered set-menu item combination is associated with a drink item selectable from among a plurality of drink items, the operator depresses the set-menu drink key 7. The names of the drink items which can be associated with the ordered set-menu item combination are indicated on the display/operation panel 5 in response to the depression of the set-menu drink key 7. When the customer tells a desired drink item, the operator designates the desired drink item from among the indicated drink items by actuating the display/operation panel 5. When the customer's order has been completed, the operator depresses the totalizing key 9. The controller 15 starts the calculator 12 in response to the depression of the totalizing key 9. The calculator 12 searches the menu-related information in the memory 11 for the ordered set-menu item combination, the discount price of the ordered set-menu item combination, the ordered drink item, and the discount price of the ordered drink item via the controller 15. The calculator 12 computes the total sum of the discount prices. Information of the computation result, that is, information of the calculated total price, is transmitted from the calculator 12 to the display 2. The calculated total price is indicated on the display 2.

In the prior-art cash register of FIGS. 1–3, when the set-menu keys 4 are operated in response to customer's orders, the discount prices of corresponding set-menu item combinations are applied to the customer's orders. On the other hand, a discount price is not applied in the following case. A customer orders unit items, and corresponding ones of the keys 8 are operated. The ordered unit items are accidentally equal to the unit items of a set-menu item combination, and the customer does not point out that the customer's order is based on a set menu. Accordingly, it is difficult to apply a discount price when a customer accidentally orders unit items equal to the unit items of a set-menu item combination.

EMBODIMENT OF THE INVENTION

Figure 4:
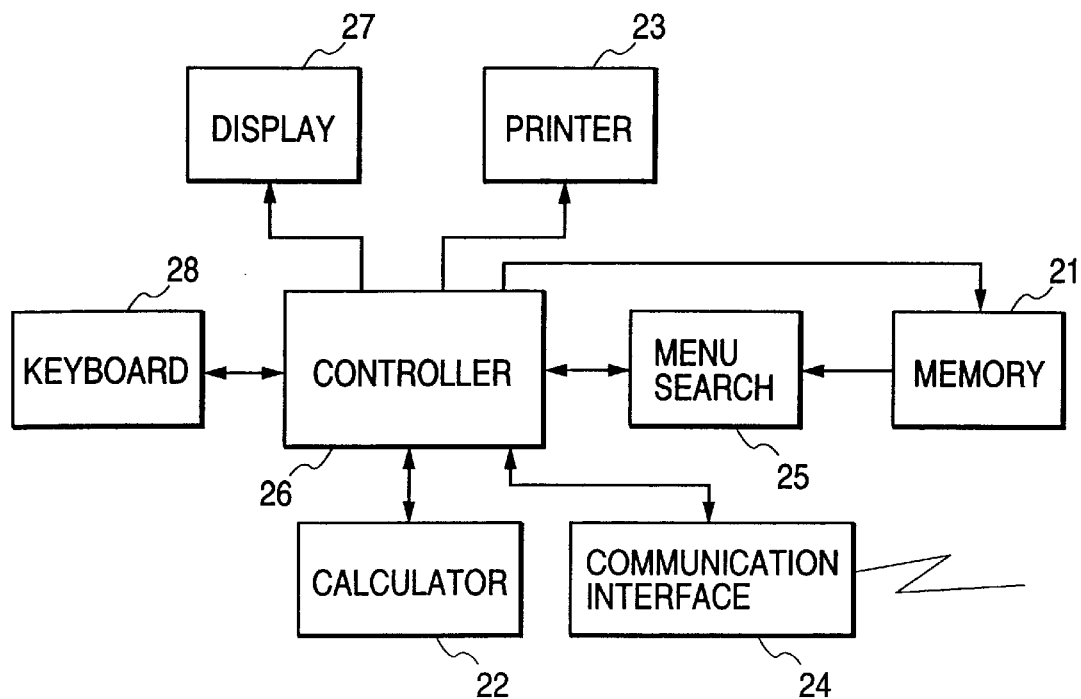
FIG. 4 is a block diagram of an electronic cash register according to an embodiment of this invention.

FIG. 4 shows an electronic cash register according to an embodiment of this invention. The electronic cash register of FIG. 4 includes a memory 21, a calculator 22, a printer 23, a communication interface 24, a menu search unit 25, a controller 26, a display 27, and a keyboard 28. The controller 26 is connected to the memory 21, the calculator 22, the printer 23, the communication interface 24, the menu search unit 25, the display 27, and the keyboard 28. The memory 21 is connected to the menu search unit 25. The controller 26 includes a CPU or a similar device having a combination of an input/output port, a processing section, a ROM, and a RAM. The controller 26 operates in accordance with a program stored in the ROM. The program is designed to implement various processes including processes indicated later.

The memory 21 stores menu-related information representing the types (the names) of unit items, the prices of the unit items, the types (the names) of set-menu item combinations, the discount prices of the set-menu item combinations, the names of drink items which can be associated with the set-menu item combinations, and the discount prices of the drink items which are applied when the drink items are ordered together with the set-menu item combinations. The calculator 22 serves to compute prices correspond to customer's orders respectively. The printer serves to generate and output receipts or other printed matters. The communication interface 24 is connected to a master apparatus in a center via a communication network. The communication interface 24 is used for data communication between the cash register and the master apparatus. The menu search unit 25 accesses the memory 21, and executes a decision about set-menu item combinations by referring the menu-related information in the memory 21. The display 27 serves to indicate information. The keyboard 28 can be used by an operator to accept customer's orders. The memory 21, the calculator 22, the printer 23, the communication interface 24, the menu search unit 25, the display 27, and the keyboard 28 are controlled by the controller 26.

Specifically, the menu search unit 25 decides whether or not a current customer's order corresponds to at least one set-menu item combination by referring to the menu-related information in the memory 21. The menu search unit 25 includes, for example, a CPU or a similar device which operates in accordance with a program stored therein. The menu-related information can be transmitted from the memory 21 to the center via the controller 26, the communication interface 24, and the communication network. New menu-related information can be transmitted to the memory 21 via the communication network, the communication interface 24, and the controller 26.

Figure 5:
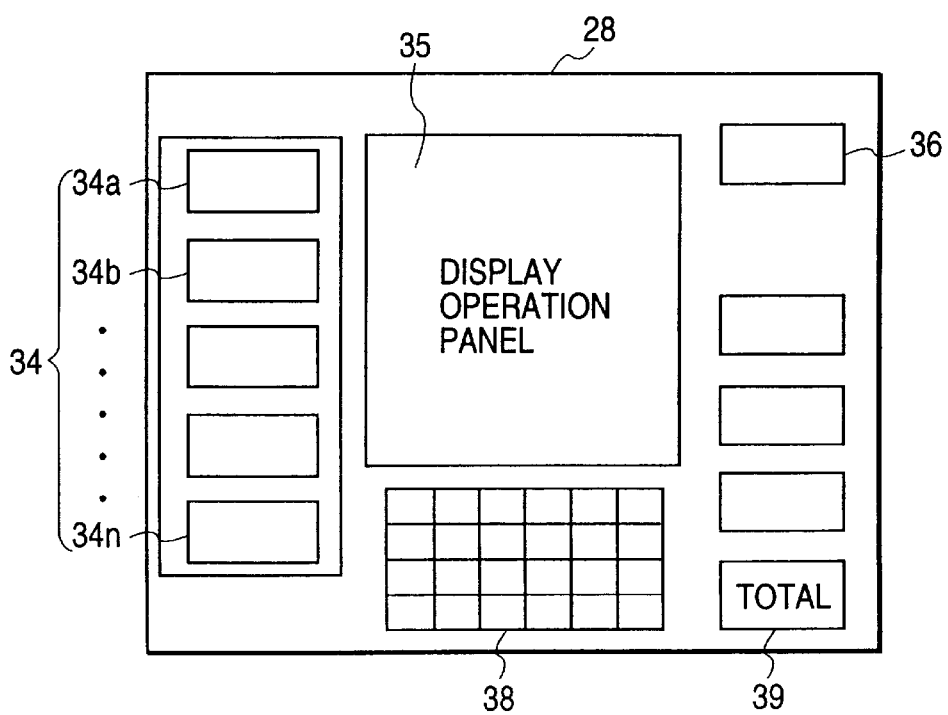
FIG. 5 is a plan view of a keyboard in the electronic cash register of FIG. 4.

As shown in FIG. 5, the keyboard 28 has an array of set-menu keys 34 including an "A" set key 34*a*, a "B" set key 34b, ..., and an "N" set key 34n for designating respective predetermined set-menu combinations of specified unit items. Examples of the set-menu item combinations are a hamburger set, a cheeseburger set, and a fishburger set. The hamburger set is a combination of one hamburger, one pack of fried potato, and one drink item (for example, "coffee"). Also, the keyboard 28 has a display/operation panel 35 for indicating the names of items, and for designating an item or items among them in accordance with a customer's order.

In addition, the keyboard 28 has a drink key 36 for designating drink items. When the drink key 36 is depressed, the names of available drink items are indicated on the display/operation panel 35 and an operator is allowed to designate a drink item or drink items among them via the display/operation panel 5 in accordance with a customer's order.

The keyboard 28 has an array of keys 38 for designating unit items (unit food items) respectively. One or more of the keys 38 are depressed to designate a corresponding unit item or corresponding unit items in accordance with a customer's order. Furthermore, the keyboard 28 has a totalizing key 39 for starting a process of calculating a total sum of the prices of ordered items.

When the set-menu keys 34, the display/operation panel 35, the drink key 36, the unit-item keys 38, and the totalizing key 39 are depressed, the keyboard 28 generates corresponding information pieces. The generated information pieces are fed from the keyboard 28 to the controller 26. The device 26 controls the memory 21, the calculator 22, the printer 23, the communication interface 24, the menu search unit 25, and the display 27 in response to the information pieces fed from the keyboard 28. Also, the device 26 can control the display/operation panel 35 in the keyboard 28. The controller 26 can transmit and receive information pieces to and from the calculator 22, the communication interface 24, the menu search unit 25, and the keyboard 28. As previously indicated, the controller 26 operates in accordance with a program stored in its internal ROM. The program is designed to implement various processes including processes for controlling the memory 21, the calculator 22, the printer 23, the communication interface 24, the menu search unit 25, the display 27, and the keyboard 28. Examples of the control processes will be explained later.

The electronic cash register of FIGS. 4 and 5 operates as follows. When a customer orders a unit item, an operator depresses one of the unit-item keys 38, which corresponds to the ordered unit item, to accept the customer's order. An example of the unit item is a hamburger, a cheeseburger, a fishburger, a pack of fried potato, or a piece of apple pie. When the customer further orders a drink item, the operator depresses the drink key 36. The keyboard 28 informs the controller 26 of the depression of the drink key 36. The controller 26 fetches information of available drink items from the memory 21 in response to the information of the depression of the drink key 36. The controller 26 feeds the information of the available drink items to the display/operation panel 35, and controls the display/operation panel 35 to indicate the names of the available drink items. In this way, the names of available drink items are indicated on the display/operation panel 35 in response to the depression of the drink key 36. The operator designates the ordered drink item from among the indicated drink items by actuating the display/operation panel 35. When the customer's order has been completed, the operator depresses the totalizing key 39. The keyboard 28 informs the controller 26 of the depression of the totalizing key 39. The controller 26 starts the calculator 22 and the menu search unit 25 in response to the information of the depression of the totalizing key 39. The menu search unit 25 receives the information of the ordered items from the controller 26. The menu search unit 25 searches the menu-related information in the memory 21 for the ordered items and their prices. In addition, the menu search unit 25 decides whether or not unit items among the ordered unit items compose at least one set-menu item combination. The menu search unit 25 notifies the calculator 22 of the search result and the decision result via the controller 26. The calculator 22 computes the price related to the customer's order on the basis of the search result and the decision result. When the decision result represents that unit items among the ordered unit items do not compose any set-menu item combination, the calculator 22 computes the total sum of the prices of the ordered unit items. When the decision result represents that unit items among the ordered unit items compose a set-menu item combination, the calculator 22 applies the discount price of the set-menu item combination to the customer's order. Thus, in this case, the calculator 22 uses the discount price of the set-menu item combination in computing the price related to the customer's order. The calculator 22 outputs information of the computation result, that is, information of the calculated total price, to the controller 26. The controller 26 transmits the information of the computation result (the calculated total price) to the display 27, and controls the display 27 to indicate the calculated total price.

When a customer orders a set-menu item combination, the operator depresses one of the set-menu keys 34, which corresponds to the ordered set-menu item combination, to accept the customer's order. The keyboard 28 informs the controller 26 of the depression of one of the set-menu keys 34. In the case where the ordered set-menu item combination is associated with a drink item selectable from among a plurality of drink items, the operator depresses the drink key 36. The keyboard 28 informs the controller 26 of the depression of the drink key 36. The controller 26 recognizes the customer's order to be related to the set-menu item combination in response to the information of the depression of one of the set-menu keys 34. The controller 26 fetches information of available drink items, which can be associated with the ordered set-menu item combination, from the memory 21 in response to the information of the depression of the drink key 36. The controller 26 feeds the information of the available set-menu-associated drink items to the display/operation panel 35, and controls the display/operation panel 35 to indicate the names of the available set-menu-associated drink items. In this way, the names of available set-menu-associated drink items are indicated on the display/operation panel 35 in response to the depression of the drink key 36. The operator designates the ordered drink item from among the indicated drink items by actuating the display/operation panel 35. The keyboard 28 informs the controller 26 of the designated drink item (the ordered drink item). When the customer's order has been completed, the operator depresses the totalizing key 39. The keyboard 28 informs the controller 26 of the depression of the totalizing key 39. The controller 26 starts the calculator 22 and the menu search unit 25 in response to the information of the depression of the totalizing key 39. The menu search unit 25 receives the information of the ordered set-menu item combination and the information of the ordered drink item from the controller 26. The menu search unit 25 searches the menu-related information in the memory 21 for the discount price of the ordered set-menu item combination and the discount price of the ordered drink item. The menu search unit 25 notifies the calculator 22 of the search result (the discount price of the ordered set-menu item combination and the discount price of the ordered drink item) via the controller 26. The calculator 22 computes the total sum of the discount price of the ordered set-menu item combination and the discount price of the ordered drink item. The calculator 22 outputs information of the computation result, that is, information of the calculated total price, to the controller 26. The controller 26 transmits the information of the computation result (the calculated total price) to the display 27, and controls the display 27 to indicate the calculated total price.

An explanation will be given of the case where a set-menu item combination (a first set-menu item combination) is ordered, and unit food items and unit drink items are additionally ordered. The order for the set-menu item combination (the first set-menu item combination) is processed similarly to the previously-mentioned case. The order for the additional food items and the addition drink items are processed as follows. The menu search unit 25 searches the menu-related information in the memory 21 for the additional food items, the prices of the additional food items, the additional drink items, and the prices of the additional drink items. In addition, the menu search unit 25 decides whether or not a second set-menu item combination is in the additional food items and the additional drink items. The menu search unit 25 notifies the calculator 22 of the search result and the decision result via the controller 26. The calculator 22 computes the price related to the customer's order on the basis of the search result and the decision result. When the decision result represents that a second set-menu item combination is absent from the additional food items and the additional drink items, the calculator 22 computes the total sum of the discount price of the first set-menu item combination, the prices of the additional food items, and the prices of the additional drink items. When the decision result represents that a second set-menu item combination is in the additional food items and the additional drink items, the calculator 22 applies the discount price of the second set-menu item combination to the customer's order. Thus, in this case, the calculator 22 uses the discount price of the second set-menu item combination in computing the price related to the customer's order. The calculator 22 outputs information of the computation result, that is, information of the calculated total price, to the controller 26. The controller 26 transmits the information of the computation result (the calculated total price) to the display 27, and controls the display 27 to indicate the calculated total price.

The menu search unit 25 includes a CPU or a similar device having a combination of an input/output port, a processing section, a ROM, and a RAM. The menu search unit 25 operates in accordance with a program stored in the ROM. The CPU in the menu search unit 25 and the CPU in the controller 26 may be common.

Figure 6:
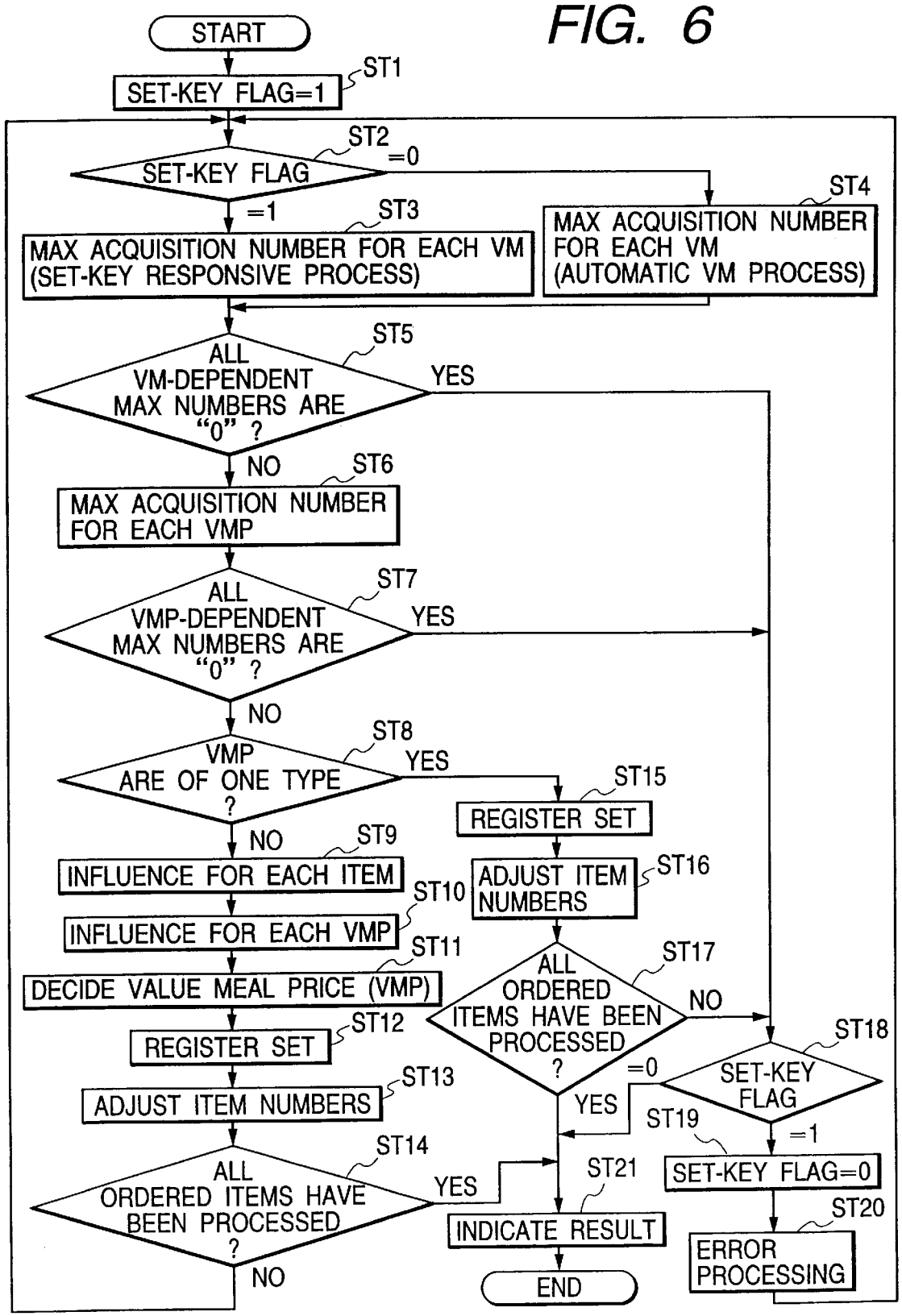
FIG. 6 is a flowchart of a segment of a program for controlling a menu search unit in FIG. 4.

FIG. 6 is a flowchart of a segment of the program for controlling the menu search unit 25. The program segment in FIG. 6 is designed to decide whether or not unit items among unit items ordered by a customer compose at least one of predetermined set-menu item combinations (predetermined value meals VM).

As shown in FIG. 6, a first step ST1 of the program segment initializes a set-key flag to "1". After the step ST1, the program advances to a step ST2.

The step ST2 decides whether the set-key flag is "0" or "1". When it is decided that the set-key flag is "1", the program advances from the step ST2 to a step ST3. When it is decided that the set-key flag is "0", the program advances from the step ST2 to a step ST4.

The step ST3 settles the VM-dependent maximum acquisition numbers according to a set-key responsive process. Here, VM denotes value meals corresponding to set-menu item combinations represented by information registered in the memory 21. The memory 21 stores VM tables related to the set-menu item combinations respectively. Each of the VM tables has information of unselectable unit items (fixed or regular unit items) in the related set-menu item combination, and also information of selectable unit items associated therewith. Examples of the unselectable unit items (the fixed or regular unit items) are a hamburger and a pack of fried potato. Examples of the selectable unit items are drink items assigned to "any" item table numbers and listed in "any" item tables. After the step ST3, the program advances to a step ST5.

The step ST4 settles the VM-dependent maximum acquisition numbers according to an automatic VM process. Specifically, the step ST4 searches the menu-related information in the memory 21 for ordered unit items and their prices, and decides whether or not unit items among the ordered unit items compose at least one value meal (a set-menu item combination) VM. The decision is carried out by collating information of the ordered unit items with information of set-menu item combinations in the memory 21. After the step ST4, the program advances to the step ST5.

The step ST5 decides whether or not the maximum acquisition numbers for all the value meals VM are "0". When it is decided that the maximum acquisition numbers for all the value meals VM are "0", the program advances from the step ST5 to a step ST18. Otherwise, the program advances from the step ST5 to a step ST6.

The step ST6 settles the maximum acquisition numbers for respective value meal prices VMP (that is, the VMP-dependent maximum acquisition numbers). The value meal prices VMP are listed in a table. The value meal price table has information of the numbers (the identification numbers) of the respective value meal prices, and information of items registered in an "any" item table. The value meal prices VMP correspond to, for example, a hamburger set plus one cola, and a cheeseburger set plus one orange juice. Information of the value meal prices VMP are set in the memory 21.

A step ST7 following the step ST6 decides whether or not the maximum acquisition numbers for all the value meal prices VMP are "0". When it is decided that the maximum acquisition numbers for all the value meal prices VMP are "0", the program advances from the step ST7 to the step ST18. Otherwise, the program advances from the step ST7 to a step ST8.

The step ST8 decides whether or not the value meal prices VMP related to the non-zero maximum acquisition numbers are of only one type. When it is decided that the value meal prices VMP related to the non-zero maximum acquisition numbers are of only one type, the program advances from the step ST8 to a step ST15. Otherwise, the program advances from the step ST8 to a step ST9.

The step ST9 decides the degrees of influence for the respective unit items represented by information registered in the memory 21. The decided influence degrees are used in selecting a desired value meal price (a final value meal price) from among the value meal prices of plural types which are defined as the possible value meal prices.

A step ST10 following the step ST9 settles or decides the degrees of influence for the respective value meal prices VMP. The decided influence degrees are used in selecting a desired value meal price (a final value meal price) from among the possible value meal prices.

A step ST11 subsequent to the step ST10 decides a final value meal price by selecting one from among the possible value meal prices in response to the influence degrees decided by the steps ST9 and ST10. The final value meal price corresponds to one of the value meals and also one of the set-menu item combinations. Accordingly, the step ST11 settles a desired set-menu item combination (a final set-menu item combination) from among the possible set-menu item combinations.

A step ST12 following the step ST11 registers information of the set-menu item combination (the final value meal) settled by the step ST11 in, for example, the RAM within the menu search unit 25.

A step ST13 subsequent to the step ST12 detects the remaining ordered unit item or items, that is, the ordered unit item or items which have not been counted as members of the final set-menu item combination (the final value meal) settled by the step ST11. The step ST13 groups the remaining ordered unit item or items.

A step ST14 following the step ST13 decides whether or not all the ordered unit items have been processed. Specifically, the step ST14 decides whether or not all the ordered unit items have been subjected to the menu search. When it is decided that all the ordered unit items have been subjected to the menu search, the program advances from the step ST14 to a step ST21. Otherwise, the program returns from the step ST14 to the step ST2.

The step ST15 regards the value meal price (or the value meal prices) in question as corresponding to a settled set-menu item combination. The step ST15 registers information of the settled set-menu item combination (the settled value meal) in, for example, the RAM within the menu search unit 25.

A step ST16 subsequent to the step ST15 detects the remaining ordered unit item or items, that is, the ordered unit item or items which have not been counted as members of the settled set-menu item combination (the settled value meal). The step ST16 groups the remaining ordered item or items.

A step ST17 following the step ST16 decides whether or not all the ordered unit items have been processed. Specifically, the step ST17 decides whether or not all the ordered unit items have been subjected to the menu search. When it is decided that all the ordered unit items have been subjected to the menu search, the program advances from the step ST17 to the step ST21. Otherwise, the program advances from the step ST17 to the step ST18.

The step ST18 decides whether the set-key flag is "0" or "1". When it is decided that the set-key flag is "1", the program advances from the step ST18 to a step ST19. When it is decided that the set-key flag is "0", the program advances from the step ST18 to the step 21.

The step ST19 changes the set-key flag to "0". A step ST20 following the step ST19 decides whether or not there is an erroneous case where an "any" item (for example, a drink item) associated with an ordered set-menu item combination fails to be registered during the acceptance of a customer's order. When the erroneous case is decided to be present, the step ST20 sets an error flag. In addition, the step ST20 controls the display 27 or the display/operation panel 35 in the keyboard 28 via the controller 26 to indicate an "any" item error thereon. After the step ST20, the program returns to the step ST2.

The step ST21 controls the calculator 22 via the controller 26 to calculate the price of the settled value meal or the prices of the settled value meals. In addition, the step ST21 controls the calculator 22 via the controller 26 to calculate the price of the remaining unit item or the prices of the remaining unit items. The step ST21 controls the display 27 via the controller 26 to indicate the calculated prices thereon. After the step ST21, the current execution cycle of the program segment in FIG. 6 ends.

First Example of Customer's Order

It is assumed that a customer orders one hamburger (HAMB), one cheeseburger (CHB), one pack of fried potato (MEDFRY), and one cola (M COKE), and that an operator accepts the customer's order without depressing any set-menu keys 34. Also, it is assumed that the discount price of a cheeseburger set is lower than that of a hamburger set.

FIG. 7 is a table indicating the contents of the customer's order. FIG. 8 is a table indicating possible value meals. Specifically, there are two possible value meals VM#, that is, a first possible value meal VM#1 and a second possible value meal VM#2. The first possible value meal VM#1 corresponds to a hamburger set. The hamburger set has one hamburger and one pack of fried potato as fixed items (regular items). The second possible value meal VM#2 corresponds to a cheeseburger set. The cheeseburger set has one cheeseburger and one pack of fried potato as fixed items (regular items).

FIG. 9 is a table indicating "any" items such as drink items associated with value meals (set-menu item combinations). In FIG. 9, a first "any" item is "cola", and a second "any" item is another drink item. FIG. 10 is a table of value meal prices VMP# which is made by combining the tables in FIGS. 8 and 9. In FIG. 10, the value meal prices VMP# are arranged in the order from the lowest price to the highest price. The value meal price VMP#1 corresponds to a cheeseburger set plus one cola. The value meal price VMP#2 corresponds to a hamburger set plus one cola.

The menu search unit 25 sequentially executes the steps in the program segment of FIG. 6 after being started to operate. First execution of the steps along a loop in the program segment is as follows.

With reference to FIG. 6, the first step ST1 of the program segment initializes the set-key flag to "1". Then, the step ST2 decides whether the set-key flag is "0" or "1". Since the set-key flag has been set to "1" by the step ST1, the step ST2 decides that the set-key flag is "1". Accordingly, the program advances from the step ST2 to the step ST3.

The step ST3 settles the VM-dependent maximum acquisition numbers according to the set-key responsive process. Then, the step ST5 decides whether or not the maximum acquisition numbers for all the value meals VM are "0". Since none of the set-menu keys 34 is depressed, the step ST5 decides that the maximum acquisition numbers for all the value meals VM are "0". Accordingly, the program advances from the step ST5 to the step ST18.

The step ST18 decides whether the set-key flag is "0" or "1". The set-key flag is "1" in this case, and the step ST18 detects this condition. Accordingly, the program advances from the step ST18 to the step ST19. The step ST19 changes the set-key flag to "0". Then, the step ST20 decides whether or not there is an erroneous case where an "any" item (for example, a drink item) associated with an ordered set-menu item combination fails to be registered during the acceptance of a customer's order. Since none of the set-menu keys 34 is depressed, the step ST20 decides the erroneous case to be absent. Thus, the step ST20 does not set the error flag. After the step ST20, the program returns to the step ST2.

Accordingly, the first execution of the steps along the loop in the program segment of FIG. 6 ends, and second execution thereof starts. The second execution of the steps along the loop in the program segment of FIG. 6 is as follows.

The step ST2 decides whether the set-key flag is "0" or "1". Since the set-key flag has been changed to "0" by the step ST19, the step ST2 decides that the set-key flag is "0". Accordingly, the program advances from the step ST2 to the step ST4.

The step ST4 settles the VM-dependent maximum acquisition numbers according to the automatic VM process. The step ST4 will be explained in more detail hereinafter.

Figures 11, 12, 13:
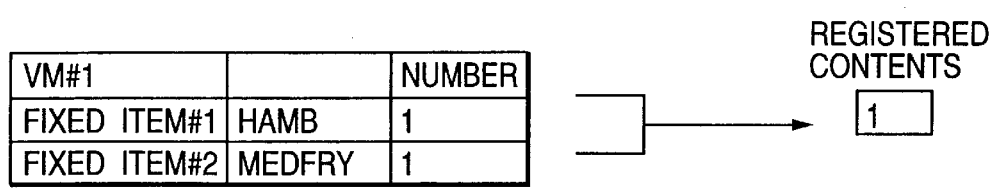
FIG. 11 is a diagram of an order-content table made in the electronic cash register of FIG. 4.
FIG. 12 is a diagram of a fixed-item table, and registered contents which are provided in the electronic cash register of FIG. 4.
FIG. 13 is a diagram of a table of VM-dependent maximum acquisition numbers which is made in the electronic cash register of FIG. 4.

FIG. 11 is a table indicating the contents of the customer's order processed at the step ST4. FIG. 12 has a table indicating the numbers of unit fixed items composing the value meal VM#1 which are contained in the customer's order. The table in FIG. 12 shows that one hamburger and one pack of fried potato are present in the customer's order. FIG. 12 also shows registered contents corresponding to the settled maximum acquisition number for the value meal VM#1. In FIG. 12, the settled VM-dependent maximum acquisition number is "1". The step ST4 writes information of the settled VM-dependent maximum acquisition numbers into the RAM within the menu search unit 25.

Specifically, the step ST4 implements the following processes. For each of the value meals VM#, the numbers of fixed unit items composing the value meal are compared to each other to decide the smallest of the numbers of the fixed unit items. The smallest of the numbers of the fixed unit items is registered as the maximum acquisition number for the value meal. For example, "1" is registered as the maximum acquisition number for the value meal VM#1. FIG. 13 is a table listing the maximum acquisition numbers for the respective value meals VM#. After the step ST4, the program advances to the step ST5.

Since "1" has been registered as the VM-dependent maximum acquisition numbers by the step ST4, the step ST5 decides that at least one of the maximum acquisition numbers for all the value meals VM is not "0". Accordingly, the program advances from the step ST5 to the step ST6.

The step ST6 settles the maximum acquisition number for each value meal price VMP while using a combination of the VM-dependent maximum acquisition number table in FIG. 13 and the value meal price table in FIG. 10. The step ST6 will be explained in more detail hereinafter.

Figures 14, 15:
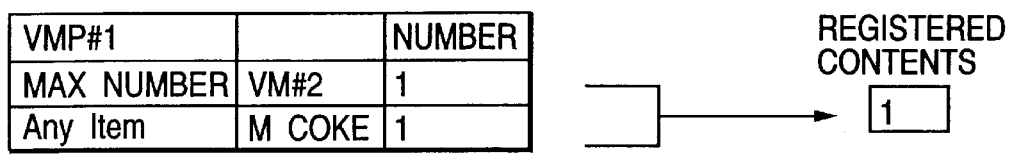
FIG. 14 is a diagram of an "any"-item/value-meal table, and registered contents which are provided in the electronic cash register of FIG. 4.
FIG. 15 is a diagram of a table of VMP-dependent maximum acquisition numbers which is made in the electronic cash register of FIG. 4.

FIG. 14 has a table indicating the numbers of the value meal VM#2 and the "any" item which can be set with respect to the value meal price VMP#1 in FIG. 10. The table in FIG. 14 shows that one value meal VM#2 can be set, and one cola can be set as an "any" item. FIG. 14 also shows registered contents corresponding to the settled maximum acquisition number for the value meal price VMP#1. In FIG. 14, the maximum acquisition number for the value meal price #1 is "1". The step ST6 writes information of the settled maximum acquisition numbers for the respective value meal price tables into the RAM within the menu search unit 25.

Specifically, the step ST6 implements the following processes. For each of the value meal prices VMP#, the numbers of value meals and "any" items contained therein are compared to each other to decide the smallest of the numbers of the value meals and the "any" items. The smallest of the numbers of the value meals and the "any" items is registered as the maximum acquisition number for the value meal price. For example, "1" is registered as the maximum acquisition number for the value meal price VMP#1. FIG. 15 is a table listing the maximum acquisition numbers for the respective value meal prices VMP#. After the step ST6, the program advances to the step ST7.

Since "1" has been registered as the VMP-dependent maximum acquisition numbers by the step ST6, the step ST7 decides that at least one of the maximum acquisition numbers for all the value meal prices VMP is not "0". Accordingly, the program advances from the step ST7 to the step ST8.

The step ST8 decides whether or not the value meal prices related to the non-zero maximum acquisition numbers are of only one type. The value meal prices related to the non-zero maximum acquisition numbers are not of only one type in this case, and the step ST8 detects these conditions. Then, the program advances from the step ST8 to the step ST9.

The step ST9 decides the degrees of influence for the respective unit items. The step ST9 will be explained in more detail hereinafter.

FIG. 16 has a cola-related table indicating value meal prices VMP# each containing a hamburger HAMB, the numbers of hamburgers HAMB in the value meal prices VMP#, and the sum "a" of the numbers of the hamburgers in the value meal prices VMP#. Since it is shown in FIG. 10 that the value meal prices VMP#1 and VMP#2 relate to "cola", the step ST9 writes information of the value meal prices VMP#1 and VMP#2 in the cola-related table. Since the number of hamburgers in each of the value meal prices VMP#1 and VMP#2 is "1", the step ST9 writes "1" into the cola-related table as the numbers of hamburgers HAMB in the value meal prices VMP#. Furthermore, the step ST9 writes "2" into the cola-related table as the sum "a" of the numbers. FIG. 16 has another table indicating the number "b" of ordered "cola". Since the number "b" of ordered "cola" is "1", the step ST9 writes "1" into the cola-number table. The step ST9 calculates a cola-related influence number (an item-dependent influence number) on the basis of the sum "a" and the number "b". The step ST9 writes information of the calculated cola-related influence number into the RAM within the menu search unit 25.

Specifically, when the sum "a" is greater than the number "b", the step ST9 registers a cola-related influence number of "1" as an indication of the presence of influence. When the sum "a" is equal to or smaller than the number "b", the step ST9 registers a cola-related influence number of "0" as an indication of the absence of influence. Since the sum "a" is equal to "2" while the number "b" is equal to "1" in this case, a cola-related influence number of "1" is registered.

The step ST9 also implements similar processes for each of the unit items other than "cola", and hence calculates the item-dependent influence numbers (the influence numbers for the respective unit items). The step ST9 registers information of the calculated item-dependent influence numbers in the RAM within the menu search unit 25.

FIG. 17 is a table listing the registered item-dependent influence numbers for the fixed items and the "any" item (or the "any" items) in the value meal prices VMP#. With reference to FIG. 17, regarding "hamburger", the sum "a" is equal to "1" while the number "b" is equal to "1". Thus, the sum "a" is equal to the number "b". Accordingly, a hamburger-related influence number of "0" is registered which indicates the absence of influence. Regarding "cheeseburger", the sum "a" is equal to "1" while the number "b" is equal to "1". Thus, the sum "a" is equal to the number "b". Accordingly, a cheeseburger-related influence number of "0" is registered which indicates the absence of influence. Regarding "fried potato", the sum "a" is equal to "2" while the number "b" is equal to "1". Thus, the sum "a" is greater than the number "b".

Accordingly, a fried-potato-related influence number of "1" is registered which indicates the presence of influence.

Regarding "cola", the sum "a" is equal to "2" while the number "b" is equal to "1". Thus, the sum "a" is greater than the number "b". Accordingly, a cola-related influence number of "1" is registered which indicates the presence of influence.

After the step ST9, the program advances to the step ST10. The step ST10 settles or decides the degrees of influence for the respective value meal prices. Specifically, the degrees of influence for the respective value meal prices are calculated by summing the influence numbers for the fixed items and the "any" items in the value meal prices. The step ST10 will be explained in more detail hereinafter.

FIG. 18 is a table listing the influence numbers for the respective unit items, and the degrees of influence for the respective value meal prices (the possible value meal prices) VMP#. With reference to FIG. 18, regarding the value meal price VMP#1, the influence numbers for "cheeseburger", "fried potato", and "cola" are equal to "0", "1", and "1" respectively. Thus, the step ST10 sets the degree of influence for the value meal price VMP#1 to "2". Regarding the value meal price VMP#2, the influence numbers for "hamburger", "fried potato", and "cola" are equal to "0", "1", and "1" respectively. Thus, the step ST10 sets the degree of influence for the value meal price VMP#2 to "2".

After the step ST10, the program advances to the step ST11. The step ST11 decides a final value meal price (a final set-menu item combination) by selecting one from among the possible value meal prices according to first and second conditions. The first condition causes selection of one from among the possible value meal prices which has the lowest degree of influence. The second condition causes selection of one from among the possible value meal prices which has the lowest discount price. The possible value meal prices are the value meal prices VMP#1 and VMP#2 in this case. With respect to the first condition, the value meal prices VMP#1 and VMP#2 are equal since both the degrees of influence thereof are "2". With respect to the second condition, the value meal price VMP#1 is predominant over the value meal price VMP#2 since the discount price of the value meal price VMP#1 is lower than that of the value meal price VMP#1. Accordingly, the step ST11 selects the value meal price VMP#1 as a final value meal price. In this case, the final value meal price corresponds to a cheeseburger set plus one cola.

The step ST11 is followed by the step ST12. The step ST12 registers information of the final value meal price (the final set-menu item combination) settled by the step ST11. The step ST12 will be explained in more detail hereinafter.

FIG. 19 is a table of value meal prices VMP# which is made on the basis of the value meal price table in FIG. 10. The value meal price table in FIG. 19 has a row of cells assigned to settlement numbers for the respective value meal prices VMP#. The step ST12 writes "1" into the cell of the value meal price table of FIG. 19 which is assigned to a settlement number for the value meal price VMP#1.

The step ST12 is followed by the step ST13. The step ST13 detects the remaining ordered unit item or items, that is, the ordered unit item or items which have not been counted as members of the final value meal price (the final set-menu item combination) settled by the step ST11. Specifically, the step ST13 updates the order-content table in FIG. 11 in response to the unit items composing the final value meal (the final set-menu item combination) settled by the step ST11. In more detail, the step ST13 deletes the unit items of the final value meal from the order-content table of FIG. 11. In this case, one cheeseburger, one pack of fried potato, and one cola which are the members of the value meal price VMP#1 are deleted from the order-content table of FIG. 11.

FIG. 20 is an order-content table resulting from the updating of the order-content table in FIG. 11 by the step ST13. Only one hamburger remains in the order-content table of FIG. 20.

The step ST13 is followed by the step ST14. The step ST14 decides whether or not all the ordered unit items have been processed by referring to the latest order-content table. Specifically, the step ST14 decides whether or not all the ordered unit items have been subjected to the menu search. Since one hamburger remains in the latest order-content table, the step ST13 decides that at least one ordered unit item has not yet been processed. Accordingly, the program returns from the step ST14 to the step ST2. Thus, the second execution of the steps along the loop in the program segment of FIG. 6 ends, and third execution thereof starts. The third execution of the steps along the loop in the program segment of FIG. 6 is as follows.

The step ST2 decides whether the set-key flag is "0" or "1". The set-key flag is "0" in this case, and the step ST2 detects this condition. Accordingly, the program advances from the step ST2 to the step ST4.

The step ST4 settles the VM-dependent maximum acquisition numbers according to the automatic VM process. The step ST4 will be explained in more detail hereinafter.

FIG. 21 is a table listing the maximum acquisition numbers for the respective value meals VM#. The table in FIG. 21 is made by the step ST4. Since the order-content table in FIG. 20 shows that only one hamburger remains, the step ST4 considers only the value meal VM#1 and sets the maximum acquisition number for the value meal VM#1 to "0". Accordingly, the table in FIG. 21 corresponds to only the value meal VM#1 and indicates that the maximum acquisition number for the value meal VM#1 is equal to "0". After the step ST4, the program advances to the step ST5.

Since the maximum acquisition number for the remaining value meal VM#1 is "0", the step ST5 decides that the maximum acquisition numbers for all the value meals VM are "0". Accordingly, the program advances from the step ST5 to the step ST18.

The step ST18 decides whether the set-key flag is "0" or "1". The set-key flag is "0" in this case, and the step ST18 detects this condition. Accordingly, the program advances from the step ST18 to the step 21.

The step ST21 controls the calculator 22 via the controller 26 to calculate the price of the settled value meal or the prices of the settled value meals. In addition, the step ST21 controls the calculator 22 via the controller 26 to calculate the price of the remaining unit item or the prices of the remaining unit items. The step ST21 controls the display 27 via the controller 26 to indicate the calculated prices thereon. After the step ST21, the current execution cycle of the program segment in FIG. 6 ends.

When the operator receives payment from the customer, the operator actuates the keyboard 28. The controller 26 is informed of the actuation of the keyboard 28. The controller 26 transmits information of the calculated prices from the calculator 22 to the printer 23, and operates the printer 23 in response to the actuation of the keyboard 28 so that the device 23 prints out a receipt concerning the customer's order. As shown in FIG. 22, the receipt indicates the applied set-menu item combination (the applied value meal), the discount price of the applied set-menu item combination, the unit items in the applied set-menu item combination, the other unit item (the remaining unit item), and the price of the other unit item.

FIG. 23 is a table diagram of the operation of the menu search unit 25. With reference to FIG. 23, the operation of the menu search unit 25 is divided into three stages corresponding to the first execution, the second execution, and the third execution of the steps along the loop in the program segment of FIG. 6. In FIG. 23, the value meal price VMP#1 which has the circled numeral "1" corresponds to a finally settled value meal.

Second Example of Customer's Order

It is assumed that a customer orders one hamburger (HAMB), one cheeseburger (CHB), two packs of fried potato (MEDFRY), one cola (M COKE), and one orange juice (M SPRT), and that an operator accepts the customer's order without depressing any set-menu keys 34. Also, it is assumed that the discount price of a hamburger set is lower than that of a cheeseburger set.

FIG. 24 is a table indicating the contents of the customer's order. FIG. 25 is a table indicating possible value meals. Specifically, there are two possible value meals VM#, that is, a first possible value meal VM#1 and a second possible value meal VM#2. The first possible value meal VM#1 corresponds to a hamburger set. The hamburger set has one hamburger and one pack of fried potato as fixed items (regular items). The second possible value meal VM#2 corresponds to a cheeseburger set. The cheeseburger set has one cheeseburger and one pack of fried potato as fixed items (regular items).

FIG. 26 is a table indicating "any" items such as drink items which can be associated with value meals (set-menu item combinations). In FIG. 26, a first "any" item is "cola", and a second "any" item is "orange juice". FIG. 27 is a table of value meal prices VMP# which is made by combining the tables in FIGS. 25 and 26. In FIG. 27, the value meal prices VMP# are arranged in the order from the lowest price to the highest price. The value meal price VMP#1 corresponds to a hamburger set plus one cola. The value meal price VMP#2 corresponds to a cheeseburger set plus one cola. The value meal price VMP#3 corresponds to a hamburger set plus one orange juice.

The menu search unit 25 sequentially executes the steps in the program segment of FIG. 6 after being started to operate. First execution of the steps along a loop in the program segment is as follows.

With reference to FIG. 6, the first step ST1 of the program segment initializes the set-key flag to "1". Then, the step ST2 decides whether the set-key flag is "0" or "1". Since the set-key flag has been set to "1" by the step ST1, the step ST2 decides that the set-key flag is "1". Accordingly, the program advances from the step ST2 to the step ST3.

The step ST3 settles the VM-dependent maximum acquisition numbers according to the set-key responsive process. Then, the step ST5 decides whether or not the maximum acquisition numbers for all the value meals VM are "0". Since none of the set-menu keys 34 is depressed, the step ST5 decides that the maximum acquisition numbers for all the value meals VM are "0". Accordingly, the program advances from the step ST5 to the step ST18.

The step ST18 decides whether the set-key flag is "0" or "1". The set-key flag is "1" in this case, and the step ST18 detects this condition. Accordingly, the program advances from the step ST18 to the step ST19. The step ST19 changes the set-key flag to "0". Then, the step ST20 decides whether or not there is an erroneous case where an "any" item (for example, a drink item) associated with an ordered set-menu item combination fails to be registered during the acceptance of a customer's order. Since none of the set-menu keys 34 is depressed, the step ST20 decides the erroneous case to be absent. Thus, the step ST20 does not set the error flag. After the step ST20, the program returns to the step ST2.

Accordingly, the first execution of the steps along the loop in the program segment of FIG. 6 ends, and second execution thereof starts. The second execution of the steps along the loop in the program segment of FIG. 6 is as follows.

The step ST2 decides whether the set-key flag is "0" or "1". Since the set-key flag has been changed to "0" by the step ST19, the step ST2 decides that the set-key flag is "0". Accordingly, the program advances from the step ST2 to the step ST4.

The step ST4 settles the VM-dependent maximum acquisition numbers according to the automatic VM process. The step ST4 will be explained in more detail hereinafter.

The step ST4 implements the following processes. For each of the value meals VM#, the numbers of fixed items composing the value meal are compared to each other to decide the smallest of the numbers of the fixed items. The smallest of the numbers of the fixed items is registered as the maximum acquisition number for the value meal. For example, "1" is registered as the maximum acquisition number for the value meal VM#1. FIG. 28 is a table listing the maximum acquisition numbers for the respective value meals VM#. After the step ST4, the program advances to the step ST5.

Since "1" has been registered as the VM-dependent maximum acquisition numbers by the step ST4, the step ST5 decides that at least one of the maximum acquisition numbers for all the value meals VM is not "0". Accordingly, the program advances from the step ST5 to the step ST6.

The step ST6 settles the maximum acquisition number for each value meal price VMP while using a combination of the VM-dependent maximum acquisition number table in FIG. 28 and the value meal price table in FIG. 27. The step ST6 will be explained in more detail hereinafter.

The step ST6 determines the numbers of value meals VM and "any" items which can be set with respect to each of the value meal prices VMP#. Then, the step ST6 implements the following processes. For each of the value meal prices VMP#, the numbers of value meals and "any" items contained therein are compared to each other to decide the smallest of the numbers of the value meals and the "any" items. The smallest of the numbers of the value meals and the "any" items is registered as the maximum acquisition number for the value meal price. For example, "1" is registered as the maximum acquisition number for the value meal price VMP#1. FIG. 29 is a table listing the maximum acquisition numbers for the respective value meal prices VMP#. After the step ST6, the program advances to the step ST7.

Since "1" has been registered as the VMP-dependent maximum acquisition numbers by the step ST6, the step ST7 decides that at least one of the maximum acquisition numbers for all the value meal prices VMP is not "0". Accordingly, the program advances from the step ST7 to the step ST8.

The step ST8 decides whether or not the value meal prices related to the non-zero maximum acquisition numbers are of only one type. The value meal prices related to the non-zero maximum acquisition numbers are not of only one type in this case, and the step ST8 detects these conditions. Then, the program advances from the step ST8 to the step ST9.

The step ST9 decides the degrees of influence for the respective unit items. The step ST9 will be explained in more detail hereinafter.

For a specified drink item (for example, "cola"), the step ST9 decides value meal prices VMP# each containing a fixed item (for example, a hamburger HAMB), the numbers of the fixed items in the value meal prices VMP#, and the sum "a" of the numbers of the fixed items in the value meal prices VMP#. The step ST9 decides the number "b" of ordered drink items for each of the value meal prices VMP#. The step ST9 calculates a specified-drink-related influence number (an item-dependent influence number) on the basis of the sum "a" and the number "b". The step ST9 writes information of the calculated specified-drink-related influence number into the RAM within the menu search unit 25.

Specifically, when the sum "a" is greater than the number "b", the step ST9 registers a specified-drink-related influence number of "1" as an indication of the presence of influence. When the sum "a" is equal to or smaller than the number "b", the step ST9 registers a specified-drink-related influence number of "0" as an indication of the absence of influence. Regarding "cola", since the sum "a" is equal to "2" while the number "b" is equal to "1" in this case, a cola-related influence number of "1" is registered. Regarding "orange juice", since the sum "a" is equal to "1" while the number "b" is also equal to "1" in this case, an orange-juice-related influence number of "0" is registered.

The step ST9 also implements similar processes for each of the unit items other than "cola" and "orange juice", and hence calculates the item-dependent influence numbers (the influence numbers for the respective unit items). The step ST9 registers information of the calculated item-dependent influence numbers in the RAM within the menu search unit 25.

FIG. 30 is a table listing the registered item-dependent influence numbers for the fixed items and the "any" items in the value meal prices VMP#. With reference to FIG. 30, regarding "hamburger", the sum "a" is equal to "2" while the number "b" is equal to "1". Thus, the sum "a" is greater than the number "b". Accordingly, a hamburger-related influence number of "1" is registered which indicates the presence of influence. Regarding "cheeseburger", the sum "a" is equal to "1" while the number "b" is equal to "1". Thus, the sum "a" is equal to the number "b". Accordingly, a cheeseburger-related influence number of "0" is registered which indicates the absence of influence. Regarding "fried potato", the sum "a" is equal to "3" while the number "b" is equal to "1". Thus, the sum "a" is greater than the number "b". Accordingly, a fried-potato-related influence number of "1" is registered which indicates the presence of influence. Regarding "cola", the sum "a" is equal to "2" while the number "b" is equal to "1". Thus, the sum "a" is greater than the number "b". Accordingly, a cola-related influence number of "1" is registered which indicates the presence of influence. Regarding "orange juice", the sum "a" is equal to "1" while the number "b" is also equal to "1". Thus, the sum "a" is equal to the number "b". Accordingly, an orange-juice-related influence number of "0" is registered which indicates the absence of influence.

After the step ST9, the program advances to the step ST10. The step ST10 settles or decides the degrees of influence for the respective value meal prices. Specifically, the degrees of influence for the respective value meal prices are calculated by summing the influence numbers for the fixed items and the "any" items in the value meal prices. The step ST10 will be explained in more detail hereinafter.

FIG. 31 is a table listing the influence numbers for the respective unit items, and the degrees of influence for the respective value meal prices VMP#. With reference to FIG. 31, regarding the value meal price VMP#1, the influence numbers for "hamburger", "fried potato", and "cola" are equal to "1", "1", and "1" respectively. Thus, the step ST10 sets the degree of influence for the value meal price VMP#1 to "3". Regarding the value meal price VMP#2, the influence numbers for "cheeseburger", "fried potato", and "cola" are equal to "0", "1", and "1" respectively. Thus, the step ST10 sets the degree of influence for the value meal price VMP#2 to "2". Regarding the value meal price VMP#3, the influence numbers for "hamburger", "fried potato", and "orange juice" are equal to "1", "1", and "0" respectively. Thus, the step ST10 sets the degree of influence for the value meal price VMP#3 to "2".

After the step ST10, the program advances to the step ST11. The step ST11 decides a final value meal price (a final set-menu item combination) by selecting one from among the possible value meal prices according to first and second conditions. The first condition causes selection of one from among the possible value meal prices which has the lowest degree of influence. The second condition causes selection of one from among the possible value meal prices which has the lowest discount price. The possible value meal prices are the value meal prices VMP#1, VMP#2, and VMP#3 in this case. With respect to the first condition, the value meal prices VMP#2 and VMP#3 are predominant over the value meal price VMP#1 since the degrees of influence of the value meal prices VMP#2 and VMP#3 are lower than the degree of influence of the value meal price VMP#1. Accordingly, the value meal price VMP#1 (corresponding to a hamburger set plus one cola) is deleted from candidates. With respect to the second condition, the value meal price VMP#2 is predominant over the value meal price VMP#3 since the discount price of the value meal price VMP#2 is lower than that of the value meal price VMP#3. Accordingly, the step ST11 selects the value meal price VMP#2 as a final value meal price. In this case, the final value meal price corresponds to a cheeseburger set plus one cola.

The step ST11 is followed by the step ST12. The step ST12 registers information of the final value meal price (the final set-menu item combination) settled by the step ST11 in, for example, the RAM within the menu search unit 25. The step ST12 will be explained in more detail hereinafter.

FIG. 32 is a table of value meal prices VMP# which is made on the basis of the value meal price table in FIG. 27. The value meal price table in FIG. 32 has a row of cells assigned to settlement numbers for the respective value meal prices VMP#. The step ST12 writes "1" into the cell of the value meal price table of FIG. 32 which is assigned to a settlement number for the value meal price VMP#2.

The step ST12 is followed by the step ST13. The step ST13 detects the remaining ordered unit item or items, that is, the ordered unit item or items which have not been counted as members of the final value meal price (the final set-menu item combination) settled by the step ST11. Specifically, the step ST13 updates the order-content table in response to the unit items composing the final set-menu item combination (the final value meal). In more detail, the step ST13 deletes the items of the final value meal from the order-content table. In this case, one cheeseburger, one pack of fried potato, and one cola which are the members of the value meal price VMP#2 are deleted from the order-content table.

FIG. 33 is a new order-content table resulting from the updating of the order-content table by the step ST13. One hamburger, one pack of fried potato, and one orange juice remain in the order-content table of FIG. 33.

The step ST13 is followed by the step ST14. The step ST14 decides whether or not all the ordered unit items have been processed by referring to the latest order-content table. Specifically, the step ST14 decides whether or not all the ordered unit items have been subjected to the menu search. Since one hamburger, one pack of fried potato, and one orange juice remain in the latest order-content table, the step ST13 decides that at least one ordered unit item has not yet been processed. Accordingly, the program returns from the step ST14 to the step ST2. Thus, the second execution of the steps along the loop in the program segment of FIG. 6 ends, and third execution thereof starts. The third execution of the steps along the loop in the program segment of FIG. 6 is as follows.

The step ST2 decides whether the set-key flag is "0" or "1". The set-key flag is "0" in this case, and the step ST2 detects this condition. Accordingly, the program advances from the step ST2 to the step ST4.

The step ST4 settles the VM-dependent maximum acquisition numbers according to the automatic VM process. The step ST4 will be explained in more detail hereinafter.

FIG. 34 is a table listing the maximum acquisition numbers for the respective value meals VM#. The table in FIG. 34 is made by the step ST4. Since the order-content table in FIG. 33 shows that one hamburger, one pack of fried potato, and one orange juice remain, the step ST4 considers only the value meal VM#1 and sets the maximum acquisition number for the value meal VM#1 to "1". Accordingly, the table in FIG. 34 corresponds to only the value meal VM#1 and indicates that the maximum acquisition number for the value meal VM#1 is equal to "1". After the step ST4, the program advances to the step ST5.

Since the maximum acquisition number for the remaining value meal VM#1 is "1", the step ST5 decides that at least one of the maximum acquisition numbers for all the value meals VM is not "0". Accordingly, the program advances from the step ST5 to the step ST6.

The step ST6 settles the maximum acquisition number for each value meal price VMP while using a combination of the VM-dependent maximum acquisition number table and the value meal price table in FIG. 27. Since the value meal price VMP#1 has been deleted from the candidates and the value meal price VMP#2 has been registered, only the value meal price VMP#3 remains in the value meal price table. The step ST6 will be explained in more detail hereinafter.

The step ST6 determines the numbers of value meals VM and "any" items which can be set with respect to the value meal price VMP#3. Then, the step ST6 implements the following processes. For the value meal prices VMP#3, the numbers of value meals and "any" items contained therein are compared to each other to decide the smallest of the numbers of the value meals and the "any" items. The smallest of the numbers of the value meals and the "any" items is registered as the maximum acquisition number for the value meal price VMP#3. Specifically, "1" is registered as the maximum acquisition number for the value meal price VMP#3. FIG. 35 is a table indicating the maximum acquisition number for the value meal price VMP#3. After the step ST6, the program advances to the step ST7.

Since "1" has been registered as the VMP-dependent maximum acquisition number by the step ST6, the step ST7 decides that at least one of the maximum acquisition numbers for all the value meal prices VMP is not "0". Accordingly, the program advances from the step ST7 to the step ST8.

The step ST8 decides whether or not the value meal prices related to the non-zero maximum acquisition numbers are of only one type. The value meal prices related to the non-zero maximum acquisition numbers are of only one type in this case, and the step ST8 detects these conditions. Then, the program advances from the step ST8 to the step ST15.

The step ST15 recognizes the value meal price VMP#3 as a final value meal price (a selection-resultant value meal price or a selection-resultant set-menu item combination) since only the value meal price VMP#3 remains. The step ST15 registers information of the value meal price VMP#3 (the selection-resultant set-menu item combination) in, for example, the RAM within the menu search unit 25. The step ST15 will be explained in more detail hereinafter.

FIG. 36 is a table of value meal prices VMP# which is made on the basis of the value meal price table in FIG. 32. The value meal price table in FIG. 36 has a row of cells assigned to settlement numbers for the respective value meal prices VMP#. The step ST15 writes "1" into the cell of the value meal price table of FIG. 36 which is assigned to a settlement number for the value meal price VMP#3.

The step ST15 is followed by the step ST16. The step ST16 detects the remaining ordered unit item or items, that is, the ordered unit item or items which have not been counted as members of the value meal price VMP#3. Specifically, the step ST16 updates the order-content table in FIG. 33 in response to the unit items which are the members of the value meal price VMP#3. In more detail, the step ST13 deletes the unit items of the value meal price VMP#3 from the order-content table of FIG. 33. In this case, one hamburger, one pack of fried potato, and one orange juice which are the members of the value meal price VMP#3 are deleted from the order-content table of FIG. 33.

FIG. 37 is an order-content table resulting from the updating of the order-content table in FIG. 33 by the step ST16. No item remains in the order-content table of FIG. 37.

The step ST16 is followed by the step ST17. The step ST17 decides whether or not all the ordered unit items have been processed by referring to the latest order-content table. Specifically, the step ST17 decides whether or not all the ordered unit items have been subjected to the menu search. Since no item remains in the latest order-content table, the step ST17 decides that all the ordered unit items have been processed. Accordingly, the program advances from the step ST17 to the step ST21.

The step ST21 controls the calculator 22 via the controller 26 to calculate the price of the settled value meal or the prices of the settled value meals. In addition, the step ST21 controls the calculator 22 via the controller 26 to calculate the price of the remaining unit item or the prices of the remaining unit items. The step ST21 controls the display 27 via the controller 26 to indicate the calculated prices thereon. After the step ST21, the current execution cycle of the program segment in FIG. 6 ends.

When the operator receives payment from the customer, the operator actuates the keyboard 28. The controller 26 is informed of the actuation of the keyboard 28. The controller 26 transmits information of the calculated prices from the calculator 22 to the printer 23, and operates the printer 23 in response to the actuation of the keyboard 28 so that the device 23 prints out a receipt concerning the customer's order. As shown in FIG. 38, the receipt indicates the applied set-menu item combinations (the applied value meals), the discount prices of the applied set-menu item combinations, and the unit items in the applied set-menu item combinations.

FIG. 39 is a table diagram of the operation of the menu search unit 25. With reference to FIG. 39, the operation of the menu search unit 25 is divided into three stages corresponding to the first execution, the second execution, and the third execution of the steps along the loop in the program segment of FIG. 6. In FIG. 39, the value meal prices VMP#2 and VMP#3 which have the circled numeral "1" correspond to finally settled value meals. It is shown that a set-menu item combination corresponding to the value meal price VMP#2 is registered during the second execution of the steps along the loop in the program segment of FIG. 6. In addition, it is shown that a set-menu item combination corresponding to the value meal price VMP#3 is registered during the third execution of the steps along the loop in the program segment of FIG. 6.

What is claimed is:

1. A method of calculating a price corresponding to a customer's order, comprising the steps of:

accepting unit items ordered by a customer;

automatically selecting unit items, from among the accepted unit items, which compose at least one of predetermined set-menu item combinations having respective predetermined discount prices; and calculating a price corresponding to a customer's order in response to the predetermined discount price of said one of the predetermined set-menu item combinations.

2. A method according to claim 1, wherein the automatically selecting step comprises:

selecting possible set-menu item combinations from among the predetermined set menu item combinations in response to the accepted unit items;

selecting a final set-menu item combination from among the possible set-menu item combinations in response to parameters of the respective possible set-menu item combinations; and automatically selecting unit items, from among the accepted unit items, which compose the final set-menu item combination.

3. A method according to claim 2, wherein the parameters include the predetermined discount prices of the respective possible set-menu item combinations.

4. An electronic cash register comprising:

a memory for storing first information of predetermined set-menu item combinations and second information of predetermined discount prices of the respective predetermined set-menu item combinations;

an input section for accepting items ordered by a customer;

a menu search unit for deciding if items among the accepted items compose at least one of the predetermined set-menu item combinations by referring to the first information stored in the memory; and a calculator for, when the menu search unit decides that items among the accepted items compose at least one of the predetermined set-menu item combinations, calculating a price corresponding to a customer's order in response to the predetermined discount price of said one of the predetermined set-menu item combinations by referring to the second information stored in the memory.

5. An electronic cash register according to claim 4, wherein the menu search unit comprises means for searching the first information in the memory for a set-menu item combination, among the predetermined set-menu item combinations, which is composed of items among the accepted items.

6. An electronic cash register according to claim 4, wherein the menu search unit comprises:

means for selecting possible set-menu item combinations from among the predetermined set menu item combinations in response to the accepted items;

means for selecting a final set-menu item combination from among the possible set-menu item combinations in response to parameters of the respective possible set-menu item combinations; and means for storing information of the parameters of the respective possible set-menu item combinations.

7. A method of calculating a price corresponding to a a customer's order, comprising the steps of:

accepting unit items ordered by a customer;

deciding if unit items among the accepted unit items compose a predetermined set-menu item combination having a predetermined discount price; and when the items of a predetermined set-menu item combination are among the accepted unit items, calculating a price corresponding to a customer's order in response to the predetermined discount price of the set-menu item combination.

8. An electronic cash register comprising:

first means for accepting unit items ordered by a customer;

second means for deciding whether or not unit items among the accepted unit items compose a predetermined set-menu item combination having a predetermined discount price; and third means for, when the second means decides that unit items among the accepted unit items compose the predetermined set-menu item combination, calculating a price corresponding to a customer's order in response to the predetermined discount price of the set-menu item combination.

* * * * *